United States Patent [19]

Shima et al.

[11] 4,407,881
[45] Oct. 4, 1983

[54] DECORATIVE SHEETS AND PROCESSES FOR PRODUCING DECORATIVE ARTICLES BY USING THE SAME

[75] Inventors: Mutsuo Shima, Tokorozawa; Kensuke Aoyama, Hatoyama; Michiro Naka, Koganei, all of Japan

[73] Assignee: Dai Nippon Insatsu Kabushiki Kaisha, Tokyo, Japan

[21] Appl. No.: 380,836

[22] Filed: May 21, 1982

[30] Foreign Application Priority Data

May 30, 1981 [JP] Japan .................................. 56-84130
Mar. 31, 1982 [JP] Japan .................................. 57-53211

[51] Int. Cl.³ .......................... B32B 3/00; B32B 7/00; B32B 31/14
[52] U.S. Cl. .................................. 428/156; 428/172; 428/195; 428/212
[58] Field of Search ............... 428/156, 172, 195, 212; 156/220, 247, 277

[56] References Cited

U.S. PATENT DOCUMENTS 4,310,370 1/1982 Arai et al. ........................... 428/195

Primary Examiner—William J. Van Balen
Attorney, Agent, or Firm—Parkhurst & Oliff

[57] ABSTRACT

By the use of improved decorative sheets each comprising (a) a hydrophilic deformative sheet which is susceptible to expansion deformation by swelling caused by water absorption and (b) a moisture penetration controlling layer formed on the entire surface of at least one side of the hydrophilic deformative sheet, each decorative sheet being designed to differ, depending upon regions of the sheet, in the degree of expansion deformation caused by water absorption, decorative articles each having a deep and clear surface unevenness or relief pattern can be obtained on hardened water-containing plastic materials. These decorative articles are applicable to various uses such as architectural materials (interior and exterior materials for walls, ceilings, etc.), decoration boards and panels, materials for sign boards and materials for packaging.

9 Claims, 8 Drawing Figures

F I G. 1
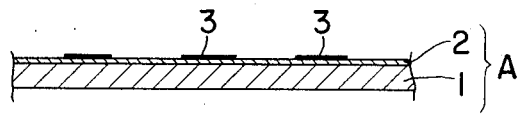
F I G. 2
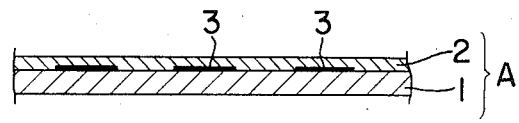
F I G. 3
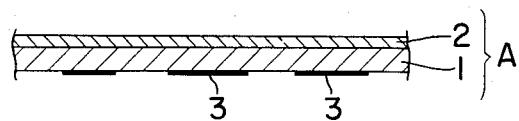
F I G. 4
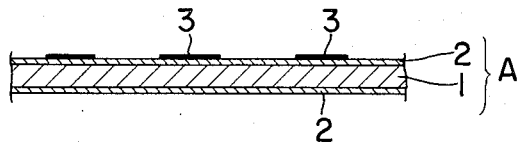

DECORATIVE SHEETS AND PROCESSES FOR PRODUCING DECORATIVE ARTICLES BY USING THE SAME

BACKGROUND OF THE INVENTION

This invention relates to decorative sheets used for obtaining decorative materials (the term "decorative articles" is intended herein to include articles which constitute parts of buildings such as decorative walls, decorative ceilings and decorative floors as well as individual decorative articles) by imparting desired patterns of surface depressions and protuberances or concavities and convexities (hereinafter referred to as surface "unevenness") to the surfaces of water-containing plastic materials such as cement, mortar and various plaster materials, as well as to processes for producing decorative articles by using the decorative sheets.

In the production of decorative articles by imparting unevenness patterns on surfaces of water-containing plastic materials, a method which uses molds such as a form, template and embossing roller has been chiefly employed. This method of using molds has the advantage of being able to impart unevenness patterns faithfully but at the same time possesses drawbacks in that the molds used are costly, give rise to poor work efficiency, and often require complicated accessory equipment and work.

As a result of various studies directed toward a simple method of forming any desired unevenness pattern, a research group to which we belong found that, by utilizing the characteristic of various resin sheets and the like of deforming by expansion or construction, chiefly by expansion, when they contact a liquid having affinity therefor, by providing, on a sheet of this character, regions which are not subject to the effect of such a liquid or regions differing in the degree in which they are affected by the liquid, for example, by printing and causing the sheet to contact a decorative material layer containing an ingredient which gives rise to expansion deformation in the sheet, an unevenness pattern corresponding to the printed pattern is imparted to the decorative material layer. On the basis of this discovery, the research group developed a process for producing decorative articles, as disclosed in the specification of Japanese Patent Laid-open No. 91061/1977.

More specifically, this process for producing decorative articles comprises the steps of superposing on a decorative layer prior to treatment a sheet provided with regions subject to expansion deformation and regions not subject to expansion deformation due to ingredients constituting the decorative layer, and/or regions having differences of degree of susceptibility to deformation, and then carrying out an appropriate after-treatment, depending on the ingredients constituting the decorative layer, thereby to cause the formation, on the decorative layer, of unevenness corresponding to the various regions. With the above process, by using a hydrophilic deformative sheet, decorative articles having surface unevenness patterns can be obtained from water-containing plastic materials.

It was found, however, that the above process had several problems. For instance, in the unevenness patterns obtained by the above process, waviness appears even on regions of decorative articles which correspond to regions of sheets not subject to expansion deformation and theoretically should be formed flatly, and distinction between uneven regions and theoretically flat regions on the decorative articles, namely, visual clearness of unevenness patterns is reduced. This problem can be solved by applying a pressure to the decorative layers and sheets at the time of expansion deformation of the sheets, as disclosed in U.S. Pat. No. 4,310,370. However, such a pressure application may sometimes be not easy depending upon where the decorative materials are applied, as in the case where unevenness patterns are imparted to wall materials. Also, in connection with the use of hydrophilic deformative sheets in the above process, there exist problems such as (a) sheet deformation occurring during storage, (b) difficulty in peeling-off of sheets from hardened decorative materials, and (c) sheet deformation occurring immediately after contact with water-containing plastic materials which does not permit time required for positioning, adjustment, deaeration, etc. Further, water absorption of sheets from water-containing plastic materials which is necessary for the sheets to deform may cause the plastic materials to lose plasticity, whereby formation of desired unevenness patterns on the plastic materials cannot be accomplished.

SUMMARY OF THE INVENTION

It is an object of this invention to solve the above described problems associated with processes for producing decorative articles.

As a result of our studies relating to the above object, we have found that substantial improvements relative to the above described problems can be obtained by using decorative sheets each of which is a laminate of the above mentioned hydrophilic deformative sheet and a moisture penetration controlling layer, the latter layer being formed on that side of the former sheet to contact the water-containing plastic material. Thus, the decorative sheet according to the present invention comprises (a) a hydrophilic deformative sheet which is subject to expansion deformation by swelling due to water absorption and (b) a moisture penetration-controlling layer formed on the entire surface of at least one side of the hydrophilic deformative sheet, the decorative sheet having regions of different degrees of expansion deformation caused by the above water absorption.

Furthermore, the process for producing decorative articles having surface unevenness patterns according to the present invention is a process for producing decorative articles having surface unevenness patterns from water-containing plastic materials by the use of the above decorative sheets, and more specifically comprises the following sequential steps.

(1) Placing into close mutual contact a water-containing plastic material before hardening and the above decorative sheet so that the moisture penetration controlling layer side of the decorative sheet is on the surface of the water-containing plastic material.

(2) Causing the above decorative sheet to swell due to water and to undergo expansion deformation in its planar direction with varying degrees depending upon its regions, and thereby forming, on the surface of the water-containing plastic material, a surface unevenness pattern corresponding to the deformation of the decorative sheet.

(3) Causing the water-containing plastic material to harden at least to the degree of possessing its own form.

(4) Peeling off the decorative sheet.

Preferably in the above step (2), water is sprayed on the surface of the decorative sheet side not in contact with the water-containing plastic material. With this water spraying, sufficient deformation can be imparted to the decorative sheet without depriving the plastic material of excess water and without causing its plasticity to be lost, and as a result a deeper and clearer unevenness pattern can be provided on the plastic material.

The nature, utility, and further features of this invention will be more clearly apparent from the following detailed description beginning with a consideration of general aspects of the invention and concluding with specific examples of practice thereof, when read in conjunction with the accompanying drawings briefly described below. In the following description, "parts" and "percent" used for expressing compositions are by weight, unless otherwise mentioned.

BRIEF DESCRIPTION OF THE DRAWINGS

In the drawings, in which the figures are all schematic sectional views taken in planes parallel to the thickness directions of examples of the decorative sheet and the decorative article produced by using the decorative sheet according to the invention;

FIGS. 1 to 4 respectively show examples of the decorative sheet of this invention;

DETAILED DESCRIPTION OF THE INVENTION

Figure 5:
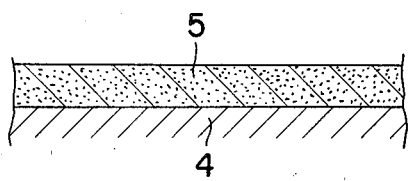
FIGS. 5 to 8 indicate process steps of producing the decorative article of the present invention by the use of the above decorative sheet, FIG. 5 showing a condition where a water-containing plastic material has been applied on a base material, FIG. 6 showing a condition where a decorative sheet has been applied onto the surface of the water-containing plastic material, FIG. 7 showing a process for deforming the decorative sheet, and FIG. 8 showing the decorative article thus obtained.

FIGS. 1 to 4 are schematic sectional views respectively showing conceptional multi-layer structures of examples of the decorative sheet according to this invention.

As one typical structural mode, as shown in FIG. 1, the decorative sheet A of this invention comprises (a) a hydrophilic deformative sheet 1, (b) a moisture penetration controlling layer 2 placed on the entire surface of one side of the sheet 1, and (c) a print layer 3 of substantially no water permeability formed on the layer 2 so as to produce a pattern. With this combination of the decorative sheet A, in regions where the print layer 3 is formed, deformation of the hydrophilic deformative sheet 1 due to water absorption and swelling is suppressed. The print layer 3 may be formed also between the hydrophilic deformative sheet 1 and the moisture penetration controlling layer 2 as seen in FIG. 2, or on one side of the hydrophilic deformative sheet 1 with the other side of the sheet 1 attached to the moisture penetration controlling layer 2 as shown in FIG. 3. From the standpoints of pattern formation effect and decorative sheet formation by printing, the mode of FIG. 1 or FIG. 2 is preferable to that of FIG. 3. As shown in FIG. 4 in comparison with FIG. 1, the moisture penetration controlling layer 2 may also be placed on both sides of the hydrophilic deformative sheet 1. In each of the sheets shown in FIGS. 1 to 4, the upper surface as viewed in the drawing is placed in contact with a water-containing plastic materail which is described later.

Materials suitable for use in each component of the laminated decorative sheet will be described. As the hydrophilic deformative sheet 1, films or sheets of hydrophilic resins such as polyvinyl alcohols (partially saponified polyvinyl acetates) and cellulose derivatives (cellophane, nitrocellulose, acetylcellulose, etc.) are used. Among these, polyvinyl alcohol films particularly a film of a polyvinyl alcohol having a crystallinity of 10 to 15%, a polymerization degree of 250 to 350, and a saponification degree of 75 to 85% is preferably used. The polyvinyl alcohol (hereinafter abbreviated as PVA) to be used as the starting material of the film is formed into an aqueous solution together with optional additives, for example, such as glycol (ethylene glycol, glycerine, etc.); additives such as cellulose derivatives (methyl cellulose, carboxymethyl cellulose, etc.), starches (dextrin, etc.), and acrylic acid esters (polymethyl acrylate, etc.); defoamants such as higher alcohols (octyl alcohol, etc.) and silicone defoamants; any viscosity stabilizers such as isobutyl alcohol, n-butyl alcohol, cyclohexanone, cyclohexanol, pyridine, phenol, calcium rhodanide and sodium rhodanide. Then, by a casting process using a moving casting surface such as that of a heated metal drum, roll or belt, the solution is cast into a film, which is then dried and subjected to heat treatment at, for example, 35° to 45° C., thereby to produce a PVA film. Depending on the necessity, the casting surface can be placed beforehand in a desired matted or delustered state. The film formation may also be carried out with use of a T-shaped die or a roller coater.

A thickness of the hydrophilic deformative sheet 1 in a range of the order of 10 μm to 2 mm, particularly about 20 to 40 μm, is suitable.

The moisture penetration controlling layer 2, in general, comprises a resin which is more hydrophobic than the material constituting the hydrophilic deformative sheet 1, and preferably an inorganic filler is added to the resin to adjust (generally increase) the water permeability of the resin. As the resin, for example, a polyurethane resin, nitrocellulose, a polyamide resin, a polyester resin, an acrylic resin, a vinyl chloride/vinyl acetate copolymer resin, etc. are used in combinations to suit an intended purpose. Particularly, a polyurethane resin formed by a combination of an acrylic polyol or polyester polyol and an isocyanate hardener is most preferably used. Such a polyurethane resin exhibits excellent adhesion with the hydrophilic deformative sheet especially when the sheet is a PVA film.

As the inorganic filler to be added to the moisture penetration controlling layer 2, titanium oxide, calcium carbonate, micro silica, etc. are used. It is preferable that a filler having an average particle size, for instance, of the order of 1 to 15 μm be added in a proportion of the order of 0.1 to 20 parts based on 100 parts of the resin.

As a matter of course, the moisture penetration controlling layer 2 is required to have a property of properly controlling moisture penetration. The layer is also required (a) not to hinder the effect of the hydrophilic deformative sheet 1 to deform and provide an unevenness pattern and accordingly (b) to have flexibility and appropriate water permeability as well as adhesion to the hydrophilic deformative sheet 1 such that the moisture penetration controlling layer will not be transferred to the hardened decorative material at the time of peeling off of the sheet. From these requirements, it is desirable that the thickness or coating quantity of the moisture penetration controlling layer be strictly controlled. As the coating quantity, about 0.5 to 10 g/m² (dried) is generally preferable. When a polyurethane resin is used, a range of the order of 1.0 to 2.5 g/m² is particularly preferable.

From the standpoint of controlling water permeability, it is preferable that the thickness of the moisture penetration controlling layer 2 be such that the moisture transmission rate (JIS Z 0208) through the decorative sheet A is lower than the moisture transmission rate through the hydrophilic deformative sheet 1 alone by 10 to 40%. Also, from the standpoint of workability, the thickness of the moisture penetration controlling layer 2 is preferably such that the time taken from the instant that the decorative sheet A has been placed in contact with water or a water-containing plastic material through the moisture penetration controlling layer 2 until the initiation of deformation of the hydrophilic deformative sheet due to swelling is in the range of 5 to 30 min., particularly 10 to 15 min. The moisture transmission rate (JIS Z 0208) is defined as the quantity of moisture which permeates through a unit area of a sample film within a unit time when the sample film contacts an atmosphere of air at 40° C. and 90% relative humidity at one side and an atmosphere of air dried by calcium chloride (moisture absorber) at the other side. When the hydrophilic deformative sheet is a PVA film, the sheet itself has a moisture transmission rate of 600 to 800 g/m².24 hr, whereas a laminate of the hydrophilic deformative sheet and the moisture penetration controlling layer according to the present invention has a lower moisture transmission rate of the order of 400 to 500 g/m².24 hr.

The moisture penetration controlling layer 2 mentioned above is obtained by mixing the above resin, an inorganic filler which is added as necessary, and a solvent which is used as necessary to make an ink such as that of solution type or hardening type, and applying this ink on the entire surface of one side of the hydrophilic deformative sheet 1 by the gravure coating method, the roll coating method, or some other method. To the above ink may be further added, as necessary, other additives such as a stabilizer, hardening agent, release agent and water repellent.

The print layer 3 is intended to suppress by its water non-permeability and rigidity the expansion deformation of the hydrophilic deformative sheet 1 due to water absorption and swelling and is formed by placing an ink or a coating locally on the hydrophilic deformative sheet 1 or on the moisture penetration controlling layer 2. This formation can be carried out by a known method such as, for example, a printing method such as intaglio or copperplate printing, lithographic printing, letterpress printing or screen press printing; a coating method such as brush coating, spatula coating or spraying; or some other technique such as decorative painting by hand or art brush painting. By such a formation method, regions as desired of letters, drawings, symbols and marks, a picture pattern or design, etc. can be formed.

For the ink or coating composition used for the formation of the print layer 3, use can be made of a hardening type composition, a solution type composition, an emulsion type composition or a sol type composition, all of which are produced by adding, to a vehicle as a major component comprising a hydrophobic resin similar to the resin constituting the above mentioned moisture penetration controlling layer 2, as necessary, one or more members of various additives such as, for example, a plasticizer, stabilizer, hardening agent, drying agent, surfactant, release agent, water repellent, wetting agent, moisture-resistant agent, softening agent, coloring agent such as a dye or pigment, and filler.

The print layer 3 is applied in a quantity necessary to impart a desired deformation-suppressing effect to the above mentioned hydrophilic deformative sheet 1. The application quantity differs depending upon the kind of the resin used, but is generally preferably in a range of the order of 0.5 to 4.0 g/m² (as dried).

As a method to cause the hydrophilic deformative sheet 1 to provide regions of different degrees of expansion deformation due to water absorption and swelling, in place of or in addition to the formation of the above mentioned print layer, a method of changing the characteristics of the sheet such as the degree crosslinking, the polymerization degree, and the degree of hydration depending upon the region of the sheet by irradiation with ionizing radiation, ultraviolet light, etc., partial heating, acid or alkali treatment, and so forth may be also used.

When the decorative sheet of the present invention is used for imparting patterns to a wide area like a part of a building such as wall or floor, it is preferable that fine peforations be made on the entire surface of the sheet, because the sheet can then adhere well to the surface of the plastic material prior to the latter's hardening without entrainment of air. Such perforations can be made on the decorative sheet by a known method such as the method in which the sheet is passed between a needle roll having needles on its entire surface and an opposing rubber roll, the method in which the film or a sheet is fed intermittently and a flat plate with needles implanted therein is moved up and down, the method in which the needles of the above needle roll or the above needle-implanted plate are heated beforehand and the sheet is melted locally with the heated needles, or the method in which a solvent capable of dissolving the sheet is placed on the sheet in the form of dots, and the sheet is warmed to be dissolved at these dots. Methods other than these may also be used.

The formation of these perforations may be carried out prior to the formation of regions differing in expansion deformation by the formation of the print layer 3 or the like as long as the perforation formation is carried out after the formation of the moisture penetration controlling layer 2. However, when the perforations are made, for instance, by needles, the flatness is reduced in areas surrounding the perforations, which causes difficulty in the formation of the print layer 3. Accordingly, the formation of the perforations is preferably carried out after the formation of the decorative sheet as shown in FIGS. 1 to 4. The diameter of the perforations is preferably in a range of the order of 0.2 to 0.4 mm, and the preferable density of the perforations is in a range of the order of 5,000 to 80,000 perforations per square meter.

Next, a basic mode of process for producing decorative articles of this invention by using the decorative sheets will be described.

In the first place, as shown in FIG. 5, a water-containing plastic material 5 is applied on an appropriate base material 4.

Examples of materials suitable for use as the base material 4 are wood product boards and sheets such as timber materials, plywoods, and particle boards; papers such as thin and thick papers, decorative papers, and corrugated cardboards; various woven fabrics and unwoven fabrics; various metal sheets such as steel sheets, stainless steel sheets, aluminum sheets, and copper sheets; various plastic boards, sheets, and films; various fibrous boards and sheets such as "hardboard"; various composite base materials of organic high-polymer compounds and inorganic substances such as gypsum boards, pulp-cement boards, rock-wool boards, wood wool (excelsior)-cement boards, and wood chip-cement boards; various inorganic boards such as transite (asbestos-slate) boards, calcium silicate boards, and GRC boards: and concrete surfaces of concrete buildings. These materials are subjected to preparation, such as pretreatment or application of adhesive depending on the necessity.

Examples of the water-containing plastic material 5 to be applied are plastic formulations prepared by mixing (a) inorganic caking binders such as hydraulic cements (portland cement, etc.), hydraulic binders (gypsum hemihydrate, etc.), dolomite, hydrated lime and various clays, (b) various additives which are added as necessary such as fillers, aggregates, coloring agents (pigments, dyes, etc.), plasticizers, stabilizers, hardening agents or retarders, hydrating agents, emulsifiers, thickeners, foaming agents, and natural or synthetic resins, and (c) water. These water-containing plastic materials per se are being widely used for construction applications as cement composition, mortar compositions, plaster compositions, and so forth. As a plaster composition, a mixture of a synthetic resin emulsion and an inorganic aggregate may be also used. The application of these water-containing plastic materials 5 on the base materials 4 is carried out by casting into a molding frame, flow coating, trowel coating, or any other suitable method, all of these methods being widely used.

Figure 6:
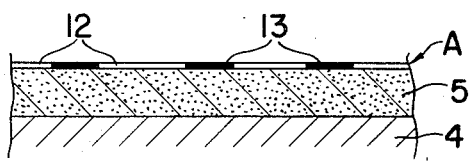
Figure 7:
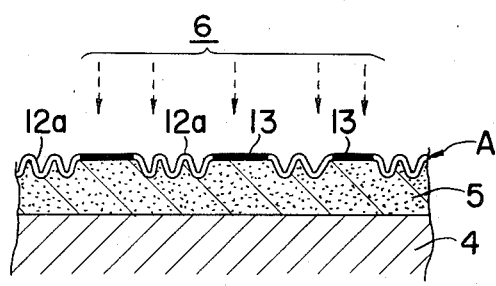
Figure 8:
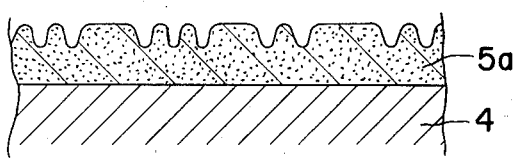

As the next step, as shown in FIG. 6, any one of the decorative sheets A shown in FIGS. 1 to 4 is caused to adhere to the plastic material 5 so that the side of the decorative sheet A where the moisture penetration controlling layer 2 is formed (the upper sides of FIGS. 1 to 4) is placed in contact with the plastic material 5. In FIGS. 6 to 8, the detailed structure of the decorative sheet A is not shown, and regions which are subject to easy deformation due to swelling of the sheet A are represented by the reference number 12 and regions which are not subject to deformation as a result of the formation of the print layer 3 is represented by the reference number 13.

At the time of the application of the decorative sheet A, in order to reduce to a minimum the quantity of the air entrained between the sheet A and the plastic material 5, it is preferable that the sheet A be caused to adhere to the plastic material 5 from one end of the sheet successively to the other end. When the sheet A has perforations, its intimate adherence to the plastic material 5 can be improved because the entrained air, if it is in the form of a small quantity of bubbles, can be removed through perforations in a step of pressing with a trowel or by any other method.

Subsequently, the above intimately adhering condition is maintained, during which time, as shown in FIG. 7, easily deformable regions 12 of the sheet A deform into a wrinkled shape (represented by the reference number 12a) as a result of water absorption from the plastic material 5 and, concurrently with the above change of the sheet A, concavities and convexities of a wrinkled shape are formed on corresponding regions of the plastic material 5. In cases where the method according to the present invention is applied to large areas such as walls, and the quantity of water is not uniformly distributed throughout the entire portion of the plastic material 5, uniform expansion deformation over the entire surface of the sheet A cannot be obtained by water absorption only from the plastic material 5. Also in some cases, the plasticity of the material 5 is reduced due to water absorption by the sheet A from the material 5. Therefore, in a preferred embodiment of this invention, as shown in FIG. 7, additional water 6 is applied on the side of the sheet A not contacting the plastic material 5 to promote deformation of regions 12 of the sheet A.

The existence of the moisture penetration controlling layer 2 in the sheet A formed on the side of the sheet contacting the plastic material 5 as shown in FIGS. 1 to 4 presents an ideal condition in which water of the plastic material 5 is not deprived in excess, and the deformation of the sheet A is caused mainly by the additional water 6. Under this condition, there can be imparted to the finished decorative material a more uniform and clearer unevenness pattern compared to that in the case where a decorative sheet not having the above mentioned moisture penetration controlling layer 2 is used and further the additional water 6 is not applied.

The application quantity of the additional water 6 is not particularly limited, but is preferably such that the entire surface of the sheet A is wetted but there is no water pool or dripping water. At the time of application of the additional water, the plastic material 5 has plasticity and is covered by only the relatively soft decorative sheet A. Therefore, it is preferable that the additional water 6 be applied so that almost no pressure is exerted on the sheet A, and that it be applied particularly by the spray coating method.

Then the condition of FIG. 7 is maintained to harden the water-containing plastic material 5 to a degree such that the material 5 can retain at least its surface shape. This hardening is caused by hydration when the binder is portland cement, gypsum or the like, and by water vaporization when the binder is clay, dolomite, or the like. During aging time, the sheet A can be pressed toward the plastic material 5 with a roll, a flat plate, or the like, if necessary.

After hardening of the material 5 (hardened material is represented by 5a), the decorative sheet A is peeled off and if necessary a post-hardening is conducted to obtain a decorative article as shown in FIG. 8. Post-hardening can be accomplished, for instance, by natural standing, heating by infrared rays, or by some other method.

In the method of the present invention, the water-containing plastic material may be colored beforehand, or it may be surface-colored after imparting of an unevenness pattern, or only depressed or protuberant regions may be colored, or the above coloring methods may be adopted in desired combinations. With these coloring methods, there can be obtained colored decorative articles or decorative articles having color patterns, in addition to non-colored decorative articles having unevenness patterns.

Decorative articles produced in this manner according to this invention have unique patterns of surface unevenness and are applicable to an extremely wide range of uses, some examples of which are as architectural materials such as interior and exterior materials for walls, ceilings, and the like, as various decorative boards and panels, as materials for signboards and billboards, and as materials for packaging.

The inventors have previously invented processes for producing inorganic decorative articles having unique surface unevenness patterns from water-containing, plastic materials by the use of decorative sheets which comprise a hydrophilic, deformative sheet and a water nonpermeating layer such as print pattern formed on the sheet (Japanese Patent Laid-open Nos. 91061/1977 and 51524/1980). As described above, in this invention, improved decorative sheets are used which, in addition to the hydrophilic deformative sheet and the water nonpermeating layer, further have a moisture penetration controlling layer. With the use of these improved decorative sheets, various advantages can be obtained such as prolonged storage period of the sheets and various rationalizations in processes for producing decorative materials. Furthermore, an essential improvement can be obtained in depth or clearness of surface unevenness patterns on finished decorative articles.

In order to indicate more fully the nature and utility of this invention, the following specific examples of practice constituting preferred embodiments of the invention are set forth, it being understood that these examples are presented as illustrative only and are not intended to limit the scope of this invention.

EXAMPLE 1

On one side of a PVA film of 30 μm thickness (Hicellone D-103 manufactured by Nichigo Film K.K.), a print layer ("as dried" coated quantity: 3.0 g/m²) was formed by gravure printing with the use of a gravure plate having a cell depth of 50 μm and a gravure ink (AR Ink manufactured by Morohoshi Ink K.K.) containing a polyurethane resin as a vehicle. Then, on the entire surface of the same side of the above PVA film, an ink (Mortar Primer manufactured by Morohoshi Ink K.K.), which was prepared by dissolving 65 parts of a polyurethane resin comprising an acrylic polyol and an isocyanate hardener, 30 parts of titanium oxide (average particle size: 1 μm) and 5 parts of finely powdered silica in an appropriate quantity of a 50/50 mixed solvent of ethyl acetate and toluene, was uniformly printed to form a moisture penetration controlling layer ("as dried" coated quantity: 2.0 g/m²). Thus, a decorative sheet equivalent to that shown in FIG. 2 was obtained.

The above PVA film had a moisture transmission rate (JIS Z 0208) of about 670 g/m².24 hr. In comparison, a composite film which was a laminate of the above PVA film and a moisture penetration controlling layer similar to the above described moisture penetration controlling layer had a moisture transmission rate (JIS Z 0208) of about 470 g/m².24 hr.

Throughout the entire surface of the above decorative sheet, perforations were made by the use of a needle roll having on its entire surface needles of about 5 mm pitch and 0.2 mm tip diameter.

On a vertical wall of a concrete body of a building, a coating layer was formed by (a) first spreading an acrylic emulsion as a primer by means of a sponge roll and allowing the emulsion to stand for 30 min. to dry and (b) then applying a water-containing plastic material having the following composition by means of a trowel to a thickness of 3 mm. thereof.

Portland cement—100 parts
Silica—30 parts
Water—50 parts

On the coating layer, the above decorative sheet having perforations was superposed so that the latter's moisture penetration controlling layer came in contact with the coating layer. Slight surface unevenness started to appear due to the deformation of the decorative sheet by water absorption. Water was sprayed with a sprayer on the entire surface of the sheet. The spraying was conducted to an extent such that water was sprayed uniformly on the entire surface, but there was no dripping of water. Due to the sprayed water and the water absorbed from the coating layer, regions of the decorative sheet not having the print pattern formed wrinkles by swelling, while regions having the print pattern remained flat. Thus, a relief pattern was formed. After the subsequent natural standing step which allowed the cement to harden, the sheet was peeled off.

EXAMPLE 2

By carrying out the procedure of Example 1 except for the use of a gypsum plaster comprising gypsum, lime and water in place of the composition comprising portland cement, silica and water, a white decorative wall having the same relief effect as that of Example 1 was obtained.

EXAMPLE 3

By carrying out the procedure of Example 1 except for the use, in place of the composition comprising port land cement, silica and water, of a 3/1 (volume) mixture of a synthetic resin emulsion (Mule Coat A manufactured by Asahi Kasei K.K.) and an aggregate (1/1 mixture of silica sand No. 5 and Sotetsu Kuro No. 5 manufactured by Hitachi Toishi K.K.), a relief pattern similar to that of Example 1 and having a fine roughness of ground stone on the pattern surface was obtained.

What we claim is:

1. A decorative sheet comprising (a) a hydrophilic deformative sheet which is susceptible to expansion deformation by swelling due to water absorption and (b) a moisture penetration controlling layer formed on the entire surface of at least one side of the hydrophilic deformative sheet, the decorative sheet having regions of different degrees of said expansion deformation caused by water absorption.

2. A decorative sheet according to claim 1 which comprises (a) the hydrophilic deformative sheet, (b) the moisture penetration controlling layer formed on the entire surface of one side of the deformative sheet and (c) a substantially water-impermeable print layer formed locally in certain regions on the moisture penetration controlling layer.

3. A decorative sheet according to claim 1 which comprises (a) the hydrophilic deformative sheet, (c) a substantially water-impermeable print layer formed locally in certain regions on one side of the hydrophilic deformative sheet and (b) the moisture penetration controlling layer formed on (a) and (c) on the same side of (a) so that the entire surfaces of (a) and (c) are covered on that side of (a).

4. A decorative sheet according to claim 1 in which the thickness of the moisture penetration controlling layer is such that the moisture transmission rate (according to JIS Z 0208) of the hydrophilic deformative sheet is reduced by 10 to 40% by the formation of the moisture penetration controlling layer.

5. A decorative sheet according to claim 1 in which fine through perforations are formed throughout the entire surface of the sheet.

6. A decorative sheet according to claim 1 in which the hydrophilic deformative sheet comprises a hydrophilic resin selected from the group consisting of polyvinyl alcohol and cellulose derivatives.

7. A decorative sheet according to claim 1 in which the moisture penetration controlling layer is a film of a coating comprising (i) a resin more hydrophobic than the constituent materials of the hydrophilic deformative sheet and (ii) an inorganic filler.

8. A process for producing decorative articles having patterns of surface concavities and convexities, which comprises the steps of:

(1) placing into mutual contact and laminating a water-containing plastic material not yet hardened and a decorative sheet comprising (a) a hydrophilic deformative sheet which is susceptible to expansion deformation by swelling due to water absorption and (b) a moisture penetration controlling layer formed on the entire surface of at least one side of the hydrophilic deformative sheet, said decorative sheet having regions of different degrees of expansion deformation caused by water absorption, so that the moisture penetration controlling layer side of the decorative sheet is on the surface of the water-containing plastic material, (2) causing the above decorative sheet to swell due to water and to undergo expansion deformation in its planar direction with varying degrees depending upon its regions, and thereby forming, on the surface of the water-containing, plastic material, a surface unevenness pattern corresponding to the deformation of the decorative sheet, (3) causing the water-containing plastic material to harden at least to the degree of retaining its shape, and (4) peeling off the decorative sheet.

9. A process according to claim 8 wherein, in the step (2), additional water is applied on the side of the decorative sheet not in contact with the water-containing plastic material.

* * * * *